United States Patent [19]

Bitzakidis et al.

[11] Patent Number: 5,798,740
[45] Date of Patent: Aug. 25, 1998

[54] LIQUID CRYSTAL DISPLAY IN WHICH DATA VALUES ARE ADJUSTED FOR CROSS-TALK USING OTHER DATA VALUES IN THE SAME COLUMN

[75] Inventors: Stefanos Bitzakidis, Redhill; Andrew M. Francis, Reigate, both of England

[73] Assignee: U.S. Philips Corporation, New York, N.Y.

[21] Appl. No.: 559,779

[22] Filed: Nov. 15, 1995

[30] Foreign Application Priority Data

Nov. 24, 1994 [GB] United Kingdom ............... 9423705
Oct. 4, 1995 [GB] United Kingdom ............... 9507414

[51] Int. Cl.$^6$ ............................................. G09G 3/36
[52] U.S. Cl. ........................................... 345/92; 345/58
[58] Field of Search ............................ 345/87, 92, 94, 345/58, 97, 98, 99, 100; 359/54, 56, 59; 349/33, 34, 41, 42, 48, 49, 50, 51

[56] References Cited

U.S. PATENT DOCUMENTS

| | | | |
|---|---|---|---|
| 4,845,482 | 7/1989 | Howard et al. | 340/805 |
| 4,892,389 | 1/1990 | Kuijk | 350/333 |
| 5,014,048 | 5/1991 | Knapp | 345/94 |
| 5,159,356 | 10/1992 | Kuijk et al. | 340/783 |
| 5,434,599 | 7/1995 | Hirai et al. | 345/94 |
| 5,442,370 | 8/1995 | Yamazaki et al. | 345/94 |

FOREIGN PATENT DOCUMENTS

| | | |
|---|---|---|
| 0313876 | 5/1989 | European Pat. Off. . |
| 0622772 | 11/1994 | European Pat. Off. . |

*Primary Examiner*—Chanh Nguyen
*Attorney, Agent, or Firm*—David R. Treacy

[57] ABSTRACT

An active matrix liquid crystal display device having a row and column array of picture elements which each include a switching device and which are driven by a drive circuit via sets of row and column address conductors to which selection and data signals are applied respectively, includes a data signal adjustment circuit which adjusts a data signal intended for a picture element prior to its application to the column conductor and according to a compensation value derived from the values of data signals intended for other picture elements using the same column conductor in the period until the picture element is next addressed so as to compensate for the subsequent effects of vertical cross-talk due to capacitive coupling effects at the picture element. In determining the compensating adjustment, blanking intervals in an applied video signal and current leakage effects can also be taken into account.

16 Claims, 4 Drawing Sheets

LIQUID CRYSTAL DISPLAY IN WHICH DATA VALUES ARE ADJUSTED FOR CROSS-TALK USING OTHER DATA VALUES IN THE SAME COLUMN

BACKGROUND OF THE INVENTION

This invention relates to an active matrix display device having a display panel comprising an array of picture elements each comprising a liquid crystal display element and a switching device connected to the display element, and sets of row and column address conductors connected to the picture elements, and a drive circuit for applying data signals to the column address conductors and for repetitively scanning the row address conductors to select each row of picture elements in sequence to drive the display elements of a selected row in accordance with the data signals applied to the associated column address conductors. The invention relates also to a method of driving such a display device.

Display devices of the above kind are well known. The switching devices used in such display devices can comprise two terminal non-linear devices, such as thin film diodes, (TFDs), MIMs and the like, or three terminal devices such as TFTs. Examples of diode type display devices and TFT type display devices are described respectively in U.S. Pat. No. 5,159,325 and U.S. Pat No. 4,845,482. In the case of display devices using two terminal switching devices the crossing sets of row and column address conductors are normally carried on respective transparent plates. The switching devices are carried on one of the substrates adjacent their respective display elements and connected in series between the display element and its associated address conductor, usually the row address conductor, on that substrate. In the case of display devices using TFTs, the sets of row and column addresses are carried on one of two spaced substrates together with a display element electrode and a TFT adjacent each intersection between the sets of address conductors, while the other substrate carries a common electrode. Each TFT is connected to its associated display element electrode and respective row and column address conductors. In both kinds of display device the driving circuit connected to the row and the column address conductors applies a selection signal to each row conductor in turn and data signals to the column conductors whereby the display elements of a selected row are charged via their respective switching device to a level dependent on the value of the data signal on their associated column conductor so as to produce a required display output effect. The rows of picture elements are driven individually in turn during respective row address periods in this manner so as to build up a display picture over one field period, the picture elements being repeatedly addressed in similar manner in successive field periods. Such display devices are suitable for datagraphic display purposes or video pictures, the data signals being derived in this case by sampling an input video, e.g. TV, signal.

A problem with these display devices is that of column coupling phenomenon and the effect of vertical crosstalk associated with this phenomenon. This phenomenon is caused by parasitic or stray capacitive effects in each picture element circuit, for example between the column address conductors and display element electrodes or as a result of the self capacitance of the switching devices, for example the TFT whose source and drain terminals are connected to a column conductor and a display element electrode respectively. As a result of such capacitances, data voltage signals present on the column conductors and intended for use in driving picture elements associated with that column conductor as they are selected are coupled to the non-selected picture elements in the column thereby affecting the outputs of supposedly isolated display elements. This vertical crosstalk can be regarded as the dependence of the RMS voltage on a given display element upon the data signals intended for other display elements in the same column.

Such cross-talk problems are discussed in U.S. Pat. No 4,845,482 which describes a proposal for reducing the effects that involves applying a gating (selection) signal to a row conductor for a time shorter than the standard row address period, applying the data signal to the column conductor during this time, and applying a compensation signal to the column conductor during the remainder of the period, the compensation signal being a function of the complement of the data signal, to reduce any cross-talk produced in other picture elements connected to the column conductor as a result of that data signal. However, because the row address period is shortened the display elements have to be charged in less time than normal and this requires using higher gating voltages which has a number of disadvantages including an increase in ageing effects on the TFTs as well as the need for comparatively high voltage row drive circuit.

The extent of vertical cross-talk in display devices using two terminal switching devices between the display elements and the column or row conductors is largely dependent on the capacitance of the switching device in relation to the display element capacitance.

In a display picture the vertical crosstalk manifests itself most obviously as bands of different luminance extending above and below particularly bright or dark areas of the picture. The magnitude of the effect is dependent on the method of driving the display device. If field inversion is used, the effect can be considerable. The effect can be reduced by using a line inversion drive scheme, intended to eliminate flicker. In this, the data signals applied to a column conductor are inverted every row as a result of which the coupled column voltages have alternating positive and negative values thereby making the overall coupled RMS voltage closer to zero and reducing the amount of vertical cross-talk. If single line inversion is used then a problem can occur in colour display devices that use the delta colour filter pattern where each column conductor is connected to picture elements having only two colours. In this case the data signal for large areas of a primary colour like red is the same as that for a plain black or white area with field inversion and large amounts of cross-talk can occur. Also, in computer datagraphic displays, the nature of some video patterns can cancel the inversion procedure, making vertical cross-talk more noticeable.

In U.S. Pat No. 4,892,389 there is described a method of driving a liquid crystal display device using two terminal non-linear switching devices so as to reduce cross-talk effects which involves applying a data signal to a column conductor for a part only of the available row selection period and substantially simultaneously with the application of a row selection signal to a row conductor and by applying a non-selection signal to the row conductor and a reference signal to the column conductor during the remaining part of the available row selection period. A disadvantage of this approach, like that of U.S. Pat. No. 4,845,482,is that the necessary reduction in the time for driving a display element with its data signal to a fraction of the available selection period causes problems. Higher peak currents through the switching devices are necessary which can damage the switching devices or at lease cause undesirable ageing effects.

SUMMARY OF THE INVENTION

It is an object of the present invention to provide an improved active matrix display device, and a method of operating such, in which the visible effects of vertical cross-talk are reduced without the aforementioned drawbacks.

According to one aspect of the present invention there is provided an active matrix display device of the kind described in the opening paragraph which is characterised in that the drive circuit includes a data signal adjustment circuit for compensating for the effects of vertical cross-talk in the display panel due to capacitive coupling between the display elements and their associated column address conductors, which data signal adjustment circuit has an input to which data signals are applied and adjusts an input data signal for a picture element according to a cross-talk compensation value which is derived from the data signals intended for at least some of the other picture elements connected to the same column address conductor as that picture element in the period until the picture element is next addressed, the data signal adjustment circuit having an output from which the adjusted data signals are supplied to the column address conductors for driving the picture elements.

According to another aspect of the present invention, there is provided a method of driving an active matrix display device having a row and column array of picture elements which each comprise a liquid crystal display element connected to a switching device and which are connected to sets of row and column address conductors, in which selection signals are applied to the row address conductors to select each row of picture elements in turn and data signals are applied to the column address conductors whereby the display elements of a selected row of picture elements are driven according to the data signals on their associated column address conductors, the rows of picture elements being driven repetitively in successive field periods, which is characterised in that, before being applied to a column address conductor, a data signal for a picture element associated with the column address conductor is adjusted to compensate for the effects of vertical cross-talk in the display panel due to capacitive coupling between the display elements and their associated column address conductors according to a cross-talk compensating value determined by the values of the data signals intended to be used for driving at least some of the other picture elements associated with that column address conductor in the period until the picture element is next addressed.

The invention stems from a recognition that rather than trying simply to reduce the amount of vertical cross-talk due to the data signals on the column address conductors, the effects of vertical cross-talk through column coupling phenomenon can be compensated by altering the data signals intended for a column of picture elements before they are applied to the picture elements to allow for the expected column coupling due to the data signals for those picture elements so that after their application to the appropriate picture elements the effect of vertical cross-talk on an individual picture element leads to the display element having substantially the intended, correct, voltage, and consequently to the display element producing an output which is closer to the intended output as determined by the value of the data signal before such adjustment. Unlike the approaches described in the aforementioned U.S. Pat. No. 4,845,482 and U.S. Pat. No. 4,892,389, the invention does not need the picture element address periods to be reduced, and hence the problems caused thereby are avoided. The need to provide means for performing the necessary correction of data signals for individual picture elements ahead of their application to the picture elements is more than outweighed by the substantial benefits achieved.

In addition to reducing the cross-talk effects, the invention offers a further significant advantage. Previously, the consequences of vertical cross-talk have imposed a limitation on the size of the picture elements. As picture element sizes are reduced, for example to provide higher density arrays, the column coupling factor increases and vertical cross-talk becomes worse. There is a limit where row inversion drive techniques cannot reduce cross-talk sufficiently. With the present invention, such picture element size limitations can be overcome.

The cross-talk compensation value for an input data signal intended for a picture element, derived according to intended data signals for at least some of the other picture elements connected to the same column address conductor in the field period subsequent to the addressing of the picture element, is preferably determined in the data signal adjustment circuit according to a capacitive coupling factor for the picture element whose value is dependent at least on the capacitance of the switching device. The parasitic capacitance of the switching device is likely to be the most influential in determining the extent of vertical cross-talk, but other stray capacitances in the picture element circuit, for example between a column conductor and a display element electrode in a TFT display device or between a row conductor and a display element electrode in a TFD display device, could be taken into consideration when determining the capacitive coupling factor to improve the effectiveness of the correction afforded by the compensation.

Although it may be that for certain kinds of display applications adequate improvement can be obtained by compensating data signals in accordance with the values of the data signals intended for some, but not all, of the picture elements associated with the column address conductor, preferably the modification of the data signals is accomplished taking into account the data signals intended for substantially all the other picture elements associated with that column address conductor for optimum results. It has been found that the reduction in cross-talk as a result of the invention varies approximately linearly with the number of data signal voltages which are applied to the column address conductor that are taken into account.

To provide effective compensation in most display situations then the adjustment made to an input data signal is preferably made according to the values of the input data signals for other picture elements in the same column during the field period which follows the addressing of the particular picture element with that input data signal. In a preferred embodiment, therefore, the input data signal is held in a store in the adjusting circuit for a field period and then adjusted according to a compensation value which is determined from the values of input data signals for picture elements in the same column that are held in the store during that field period. The store is required because there is a need to know the actual data signals, as determined by the applied video signals, which are intended for those other picture elements ahead of the addressing of a picture element with the input data signal concerned. The intended data signals used in the derivation of the compensation value are then the actual data signals according to the applied video signal, to be used. In practice, a field store may be used to hold the data signals.

A simpler approach may be used in certain circumstances and particularly where the display device is used to a large extent for displaying principally stationary images or images which contain stationary part. In another embodiment, therefore, the data signal adjustment circuit adjusts an input data signal according to a crosstalk compensation value that is derived from the values of data signals input during the immediately preceding field period. With this approach, therefore, the intended data signals used in the derivation of the compensation value are not the actual input data signals for other picture elements in the same column but instead are postulated data signals and are predicted on the basis the data signals for a following field period will, apart from, for example, a change of sign in the case of field inversion being used, remain the same for a stationary image. In other words, the actual, future, data signals voltages can be assumed to be simply the negative of the current data signal voltages. Thus, the current data signals values can be used to predict the future data signal values. The need to provide a field store is thus avoided. The data signal predictions will, of course, be incorrect in the event that the input data signals are changed to provide a different display image. However, the effects of such a change between two display images before the data signal adjustments are corrected can be limited to two fields which is unlikely to be noticeable. Preferably, however, in order to accommodate a situation where continuous motion is to be displayed, the data signal adjustment circuit is arranged so as to compare values dependent on the input data signals for a column in consecutive fields and to disable the adjustment to the input data signal for a column in the event that the values in consecutive fields differ by a predetermined amount. Thus, the input data signals are used to address the picture elements of the column concerned without adjustment for crosstalk compensation. Although the effects of crosstalk will then be present, they are likely to be less visible than the effects caused if adjustment, on the basis of incorrect, predicted, data signals, were to continue.

The data signal is preferably adjusted substantially according to a compensating factor which is determined by the intended data signals for the other picture elements connected to the same column address conductor, the intended display element voltage, and a capacitive coupling factor for a picture element circuit. This coupling factor would be dependent on, for example, the display-element capacitance and stray capacitance, especially the parasitic capacitance of the switching device.

In the case of the data signals being derived from an applied video, e.g. TV, signal, in which successive fields are separated by a field blanking interval, then because the blanking interval can be a significant part of the field period it may also be taken into account in the derivation of the adjusted data signals.

The compensation value need not be dependent solely on capacitive coupling effects but can be derived also to take into account leakage current effects in the switching devices. These leakage current effects, as can occur in TFTs or two terminal devices such as MIMs and TFDs due for example to their inherent behaviour or photosensitive properties, are similarly dependent on the levels of voltages appearing on the column address conductor. A correction for such leakage current can be incorporated in the compensation value by appropriately modifying the formula given above used in the calculation of this value.

BRIEF DESCRIPTION OF THE DRAWINGS

Active matrix liquid crystal display devices and methods of driving such in accordance with the invention will now be described, by way of example, with reference to the accompanying drawings in which.

It should be understood that the same reference numerals are used throughout to denote the same or similar parts.

DETAILED DESCRIPTION OF THE PREFERRED EMBODIMENTS

Figure 1:
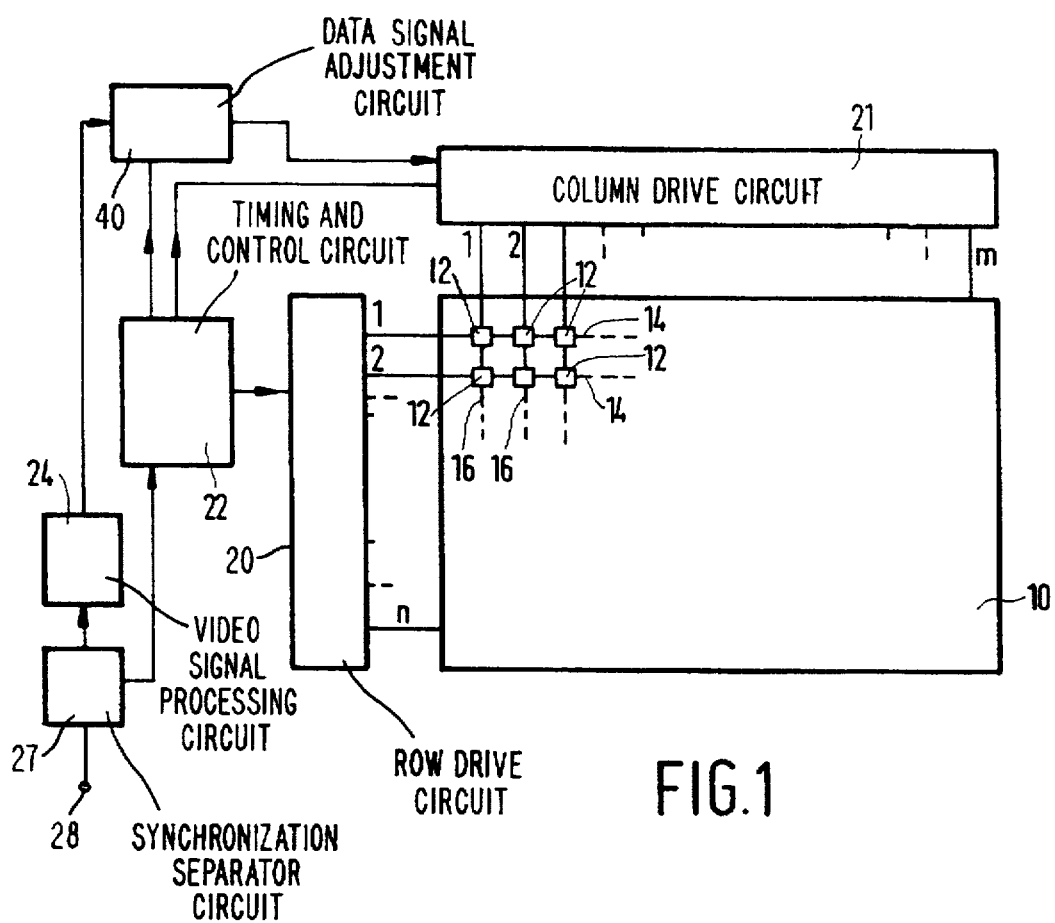
FIG. 1 is a simplified schematic block diagram of an embodiment of an active matrix display device according to the present invention.
Figures 2A, 2B:
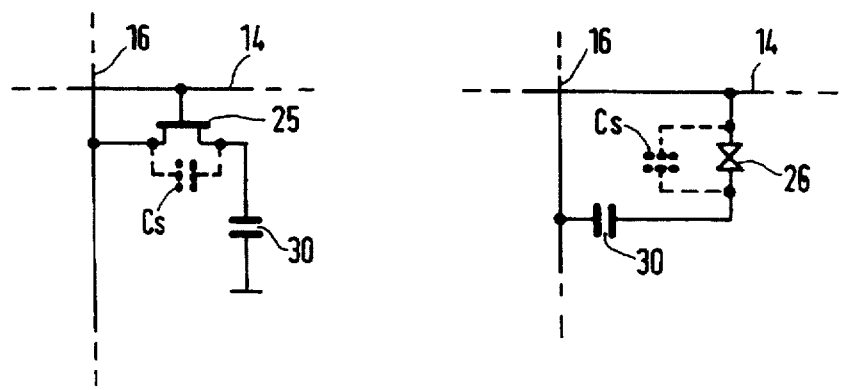
FIGS. 2A and 2B illustrate alternative forms of picture elements of the display device.

Referring to FIG. 1, the active matrix display device comprises a liquid crystal display device intended to display video, e.g. TV, pictures, or datagraphic information and includes a liquid crystal display panel 10. The panel 10 has a row and column array, comprising n rows and m columns, of picture elements 12 each of which is located adjacent a respective intersection between sets of row and column address conductors 14 and 16 to which drive signals are applied by row and column drive circuits 20 and 21. The panel 10 is of a known kind and can be of the type using TFTs or two terminal non-linear devices as switching devices for the picture elements. FIGS. 2A and 2B show respectively the circuit configurations of a typical picture element of a TFT active matrix panel and a two terminal non-linear device active matrix panel. In the former, FIG. 2A, the gate of the TFT, 25, is connected to a row address conductor 14 and its source and drain terminals are connected respectively to a column address conductor 16 and an electrode of a display element 30. The sets of conductors 14 and 16, the TFTs and the display element electrodes of the panel are all carried on a first transparent substrate of the panel, for example of glass, which is spaced from a second transparent substrate with liquid crystal material e.g. twisted nematic LC material, disposed between the substrates. Respective portions of a continuous transparent electrode carried on the second substrate constitute second electrodes of the display elements whereby each display element 30 consists of a pair of spaced electrodes with LC material sandwiched therebetween. In the latter case, FIG. 2B, the two terminal non-linear switching device, 26, for example, a MIM device, back to back diodes, MSM (metal-semiconductor-metal) device or other TFDs or the like is connected between a row address conductor and a display element electrode. The display element electrodes are carried together with the set of row address conductors and the devices 26 on a first transparent, glass, substrate which is spaced from a second substrate with liquid crystal material disposed between the two substrates. The second substrate carries a set of strip electrodes, constituting the set of column address conductors and portions of these column conductors overlying the display element electrodes form second display element electrodes such that, again, each display element 30 consists of two spaced electrodes with LC material sandwiched therebetween. Instead of being connected between the display element and a row conductor, the switching devices may be formed on the same substrate as the column conductors and connected between the column conductors and the display elements. In both types of panel, all picture elements in the same row are connected to a respective one of the set of row address conductors 14 and all picture elements in the same column are connected to a respective one of the column address conductors 16. The substrates carry respectively on their outer and inner surfaces polarising and LC orientation and protection layers respectively in conventional manner.

The row and column drive circuits 20 and 21 of the display device are each also of a conventional kind. The row drive circuit 20, for example a digital shift register circuit, applies a selection signal to each row conductor 14 sequentially in turn during a respective row address period. This operation is controlled by timing signals from a timing and control circuit 22 to which synchronisation signals, derived by a synchronisation separator circuit 27 from an incoming video, e.g. TV, signal applied to an input 28, are supplied. The column drive circuit 21 comprises one or more shift register/sample and hold circuits for which data, (video information) signals derived from the applied video signal are provided from a video signal processing circuit 24. The circuit 21 operates to sample these signals, under the control of the timing and control circuit 22 in synchronism with row scanning to provide serial to parallel conversion appropriate to the row at a time addressing of the panel. As each row conductor 14 is scanned with a selection signal, the switching devices, 25 or 26, of the associated row of picture elements are turned on so as to charge the display elements 30 of the row to a desired display element voltage according to the level of the data signal then subsisting on their respective column conductors 16, the display element voltage being proportional to the data signal voltage. Upon termination of the selection signal, the switching devices of the picture elements are turned off, thereby isolating the display elements from the column conductors until they are next addressed in the subsequent field period. Each row of picture elements of the panel is addressed in this manner so as to build up a display picture in a field period and the operation is repeated in successive field periods to produce a succession of display image fields. In the case, for example, of a TV display, each row of display elements is provided with picture information, data, of a TV line with the duration of selection signal corresponding to TV line period or less so that for a half resolution PAL standard TV display having a line period of 64 µs, each row address conductor is supplied with a selection signal at intervals of 20 ms.

In order to avoid electrochemical degradation of the LC material, the polarity of the drive signals is periodically inverted, for example after every field, (field inversion). Polarity inversion may also be carried out after every row or every two rows, commonly referred to as line (row) inversion and double line (row) inversion, in order to reduce flickering effects.

From the foregoing description, it will be apparent that during operation of the display device each column address conductor 16 carries a voltage waveform which consists of a series of data signal voltage levels each of which is intended for a respective one of the picture elements in the column of picture elements connected to that column conductor. Ideally, every display element in a column will be accessed when its associated row conductor is selected and remain electrically isolated for the remainder of the display cycle. However, there exists a capacitance at least across each switching device which couples the column conductor voltage waveform to its associated display element and this coupling leads to vertical cross-talk. To reduce the effects of such cross-talk, the display device includes a data signal adjustment circuit 40 in its drive circuit that operates to adjust the supplied data signals, intended to produce desired outputs from the display elements, before they are applied to the column conductors in such a way as to compensate for the anticipated effects of this cross-talk so that, after the display elements have been driven using the adjusted data signals, the effect of the cross-talk resulting from the voltage waveform on the column conductors is to cause the display elements to produce display outputs approaching those intended had there been no cross-talk. To this end, the value of an input data signal from the input video signal and intended for application to a picture element via a column conductor is adjusted having regard to the values of the data signals from the video signal which it is intended are to be used for at least some of the other picture elements subsequently addressed via that column conductor up till the time the picture element is next addressed. The adjustment made to each data signal, in the form of a cross-talk compensation value which is derived from, and thus determined by, intended data signals for other picture elements connected to the same column conductor in the period until the picture element concerned is next addressed, compensates for the likely effects on the display element voltage due to cross talk caused by the capacitive coupling of later applied data signals on the column conductor so that when the display element voltage is affected by this coupling, the resulting voltage, and hence display output, of the element is close to that originally intended as determined by the value of the data signal prior to adjustment.

To understand the nature of this adjustment, the column coupling effects leading to vertical cross-talk need to be considered.

The amount of coupling depends on the coupling factor "c" which is defined as:

$$c = \frac{1}{1+k} \quad (1.1)$$

where k is the ratio of the average display element capacitance over the total parasitic capacitance between the column conductor and the display element electrode in the case where the switching device is connected between the column conductor and the display element or between the row electrode and the display element electrode in the case where the switching device is connected between the row conductor and the display element. From this, it will be appreciated that as the capacitance between the column conductor and the display element electrode increases so does the coupling factor and that if the capacitance of the display element is reduced the coupling factor increases yet again. Therefore, display elements of small size will suffer more from vertical cross-talk than larger size display elements for a given size of switching device. The parasitic capacitance determining the coupling factor will largely be dependent on the capacitance of the switching device, which is represented in FIGS. 2A and 2B by the dotted capacitor Cs. There can be other stray capacitances in a picture element circuit which play a part, for example the stray capacitance between a column conductor and a display element electrode in a TFT display panel or between a row conductor and the display element electrode in MIM/TFD type display panel. In the general case, the coupling factor c may be taken to be equal to the sum of the switching device capacitance and the stray capacitance divided by the sum of the display element capacitance, the switching device capacitance and the stray capacitance.

Considering a display element in the xth row, then the column voltages for display elements x+1 to n of the current field followed by the column voltages for display elements 1 to x−1 of the next display field will be coupled to the xth pixel. In other words, after the addressing of the display element in the xth rows, all the data voltage signals intended for the other n−1 display elements in the same column which appear on the associated column conductor 16 in the period, corresponding to a field period, before that display element is again addressed will be coupled. Thus, the coupled column voltage for any display element is the part of the column waveform which corresponds to the column voltages for the next n−1 display elements in time. Because in practice the display device is operated with some kind of inversion (field, line, double line), then the coupled voltages will change polarity accordingly.

The voltage of a display element affected by capacitive column coupling can be expressed in its simplest form by the following formula:

$$V'_p = \frac{1}{\sqrt{n-1}} \sqrt{\sum_{i=2}^{i=n} (V_p + cV_c(i))^2} \qquad (1.2)$$

where $V_p$ is the intended display element voltage without accounting for column coupling, and is proportional to the applied column, data signal, voltage, and $V'_p$ is the display element voltage which includes the effects of column coupling. The number of display elements in a column is n and for every display element there is the corresponding column voltage, $V_c(i)$, where i signifies the individual column (data signal) voltage which is coupled to the affected display element via the coupling factor "c". The elements of the summation correspond to the next "n−1" column voltages as discussed above. It is important to remember that the value of $V_c(i)$ can be negative as well as positive. If the display device operates in field inversion, as well as field inversion, then the polarity of the column voltage changes with every new field while if the display operates in line inversion, as well as field inversion, the polarity alternates with every new line.

For most kinds of display images, the total error due to column coupling in a display panel operating with line inversion is generally less than that for field inversion. One of the advantages of using line inversion is that for most images column coupling, and hence vertical crosstalk, the consequent visible artifact, is reduced.

A further point to be considered is the difference between the number of display lines (rows) and the number of video lines in the applied video signal which may include blanking lines. Equation (1.2) ignores any blanking interval. The blanking time can be a significant part (more than 5% for example) of the field period and if this is the case then it may be included in the calculations by modifying equation (1.2) to take into account the total number of lines in one field of the video signal including the blanking lines (for example 312 for PAL standard TV display) as well as the number of displayed lines (i.e. the number of picture element rows), and the fixed column blanking voltage value which corresponds to the blanking interval lines. Because, however, blanking interval introduces a small, fixed, error this error can instead be corrected by adjustment of other drive voltages.

The resulting shift in the display element voltage from the intended value to a new one affects the transmission of the display element. Considering, for example, a display device operating in field inversion and being used to display a central black square in a 30% transmission background, then the visible artifact of vertical crosstalk caused by column coupling will result in the display regions above and below that central black square having transmission levels different to that of the remainder of the background. Because the display device operates in field inversion the area directly above the black central square will appear darker since the coupled voltage will shift the display element of that region in the direction of black but the area directly below the square will appear lighter because the coupled voltages (from the next field now) will be of opposite polarity and therefore will shift the display element voltages of that region towards the other direction.

Such vertical crosstalk is particularly noticeable on display devices operating in field inversion. Line inversion can reduce the problem up to a point but if the nature of display picture is such that it tends to cancel the inversion pattern (for example black lines alternating with white lines) then crosstalk can again be highly visible. Patterns of this kind are commonly found on computer generated images. The above description relates to simple monochrome displays. Colour display devices using the so-called delta-nabla colour display element configuration will also suffer from crosstalk since the effects of row inversion in these display devices can similarly be cancelled in display pictures which contain blocks of primary colours.

An added complication of the column coupling phenomenon is the coupling of the first transition of the column voltage after the display element has been addressed, referred to as column kickback, which is another contributory factor to the overall RMS calculation (equation 1.2) because it will shift the overall voltage level of the display element. The column voltage waveform will be coupled to the display element at this new level. Column kickback changes the display element voltage from $V_p$ to $V_{pc}$ which is equal to $V_p$ minus $cV_c$ where the column voltage of the affected display element in the column is $V_c$. The value of the column voltage must have the appropriate sign.

If the column kickback phenomenon and the blanking interval are included in the calculations then the equation for column coupling becomes:

$$V'_p = \frac{1}{\sqrt{l-1}} \sqrt{\sum_{i=2}^{i=n} (V_{pc} + cV_c(i))^2 + (l-n)(V_{pc} + cV_b)^2} \qquad (1.3)$$

where l is the total number of lines in one video signal field and $V_b$ is the fixed blanking voltage.

In the display device of FIG. 1, the phenomenon of vertical crosstalk is compensated by appropriately modifying the data signal voltages applied to the display elements. Equation 1.2 gives the voltage, $V'_p$ of a display element when it is affected by column coupling. By applying instead an adjusted data voltage Vn to the display element according to the equation:

$$Vn = Vc - \Delta Vp \qquad (2.1)$$

where $\Delta Vp$, the correction factor, is given by $$\Delta Vp = V'_p - Vp \qquad (2.2)$$

then, after column coupling occurs, the effects of such column coupling will be substantially compensated and the voltage on the display element will be close to the one required so that the display output obtained from the display element approaches that intended. For example, if for a given display element a voltage of 4V rms is required, and, after applying the equation 1.2, it is found that the actual voltage will be 4.3V rms where the additional 0.3V rms is the coupled voltage due to column coupling of the data voltages for other display elements connected to the same column conductor applied during a field period between addressing the display element concerned and next addressing that display element then by applying around 3.7V initially instead to the display element, the effects of the column coupling can be largely negated and the actual rms display element voltage would be very close to the intended value of 4V. Of course, this compensation is not exact, bearing in mind that the compensation is derived from the originally intended data signals for the other display elements in the same column before they too are adjusted. If those data signals are similarly compensated, the actual data signal levels applied to the column conductor will, of course, differ from those used in the computation of the adjusted data signal. Considering, for example, the display element in the xth row, then compensation for column coupling is derived from the anticipated column voltages for the display elements in rows x+1 to x+(n-1). When the next display element x+1, is compensated for column coupling, the compensated data signal will change the display element voltage very slightly from that envisaged. This implies that the calculations for display element x contain an error since the actual column voltage for display element x+1 is different from the one assumed. Exact compensation would only be feasible for stationary images and periodic moving images. However, it has been found that the above described approach is highly successful and can eliminate, or at least significantly reduce, the visible vertical cross-talk. In simulations involving worst possible envisaged display conditions for a display device operating with field inversion, a display element was found to have an additional 0.25v due to column coupling. After applying the algorithm, Equation 2.1 using the simple formula 1.2., to adjust the level of the data signal applied to the display element for column coupling compensation purposes, it was found that the additional voltage on the display element after actual column coupling was reduced to a mere 3 mV. The reduction obtained, of the order of almost 100 to 1, is entirely adequate for all practical applications.

In experiments with a display device operating a field inversion, and without compensation, and displaying a central black or white square on a grey-scale background it was found that the transmission values of the regions directly above and below the central square showed considerable differences with the transmission levels of the remainder of the background but that after compensation these differences were effectively eliminated and vertical crosstalk was reduced to below visibility levels. Corrections using the formula 1.3 could provide still further improvements. Crosstalk under single line inversion shows an improvement of a similar order to field inversion crosstalk. Since vertical crosstalk manifests itself more as line flicker than as an overall transmission change on display devices operating under line inversion, the compensation reduces the flicker level accordingly.

The data signal adjustment circuit may be arranged so as to provide additional adjustment to the data signals for effects other than those due solely to capacitive coupling and which similarly lead to vertical cross-talk, and in particular for leakage in the switching devices producing leakage current induced cross-talk. This leakage current may be caused by, for example, the inherent behaviour, and in some cases the photosensitive properties, of the switching devices (TFTs and two—terminal devices) and its extent is similarly dependent on the level of voltages applied to the column conductors. Adjustment for this effect can be accommodated in the data signal adjustment circuit by using an appropriately modified form of the formula 1.2 in the derivation of the data signal compensation value.

Referring again to FIG. 1, the compensation for vertical cross-talk by pre-correcting the incoming video signal is performed by the compensation unit 40 connected between the video processing circuit 24 and the column drive circuit 21 which operates to modify the voltage levels of, analogue input video data signals, preferably supplied from the processing circuit 24 to the unit 40 in digitised form, and to determine the data signals to be supplied by the column drive circuit 21 to the picture elements, according to the correction algorithm of equation 2.1.

Embodiments of the display device, and in particular the unit 40, and their methods of operation will now be described. In the first embodiment, the adjustment of the input data signals is performed on the basis of the actual data signals, as determined by the input video signal, to be used for other picture elements connected to the same column in the next period.

As equation 1.2 shows, implementation of the compensation algorithm requires extensive computation to generate a compensated data signal for each picture element. The summation term in equation 1-2 can be broken up and simplified to:

$$(n-1)V_p^2 + 2cV_p \sum_{i=2}^{i=n} V_c(i) + c^2 \sum_{i=2}^{i=n} V_c(i)^2 \quad (3.1)$$

The summation for the next display element, p+1, in the column will be:

$$(n-1)V_{p+1}^2 + 2cV_{p+1} \sum_{i=3}^{i=n+1} V_c(i) + c^2 \sum_{i=3}^{i=n+1} V_c(i)^2 \quad (3.2)$$

It should be noted that $V_c(n+1)$ is in fact $V_c(1)$ of the next field. The two summations for display element "p+1" differ by only a simple addition and subtraction from the summations for display element "p" since:

$$\sum_{i=3}^{i=n+1} V_c(i) = \sum_{i=2}^{i=n} V_c(i) + V_c(n+1) - V_c(2) \quad (3.3)$$

If, therefore, two running sums are kept for every column, the calculations can be significantly simplified.

Because it is necessary to know the actual data signals intended for the other picture elements in advance, the column coupling compensation unit 40 requires a field store where the values of the data signals for the display elements which will affect the current display element will be stored. This effectively is a "rolling" store since a new row of display element values will enter when an old one is dropped out. The field store is necessary because the contents of the present display element(s) will be affected by future ones. In effect it is a field delay and this field delay should operate with the same number of luminance gray scales as the display.

The operation of an embodiment of the circuit 40 when performing connections according to equations 1.2 and 2.1 will now be described with reference to FIG. 3 which shows schematically an example circuit implementation.

The vertical crosstalk correction must be calculated separately for each picture element as the video signal passes through the compensation circuit. Therefore the hardware must solve equations 1.2 and 2.1 at picture element rate. A look-up table can be used to calculate the correction at the required speed. The look-up table requires the following three input variables in order to solve the equations:

a) The picture element voltage $V_p$ for the picture element (y,x) where y and x designate the row and column respectively.
b) The sum of the column voltages $\Sigma V_c$ that are intended to be applied to column x over the following field period.
c) The sum of the squares of the column voltages that are intended to be applied to column x over the following field period.

In practice these variables can be supplied to the look-up table in the form of digital video data rather than a direct binary representation of the actual voltages. A simple data-to-$V_p$ or $V_c$ conversion can be built into the look-up table without any extra complexity.

Rather than calculating $\Sigma V_c$ and $\Sigma V^2$ from scratch for each picture element, $\Sigma V$ and $\Sigma V^2$ are maintained as running totals and stored in a RAM. These running totals can be maintained as follows. Each time a picture element data signal for column x enters the field delay, the data and data squared for that picture element is added to the column sums. Each time a picture element data signal for column x emerges from the field delay, the data and data squared for that picture element is subtracted from the column x sums. Separate sums are maintained for all columns in the display. Thus, by the time the video data for a given picture element emerges from the field delay $\Sigma V_c$ and $\Sigma V^2$ for all the picture elements in the same column have been summed and are ready to be used in the calculation of the vertical crosstalk correction for that picture element. In this way, the appropriate correction can be calculated and added to the video data for each picture element as it emerges from the field delay.

Figure 3:
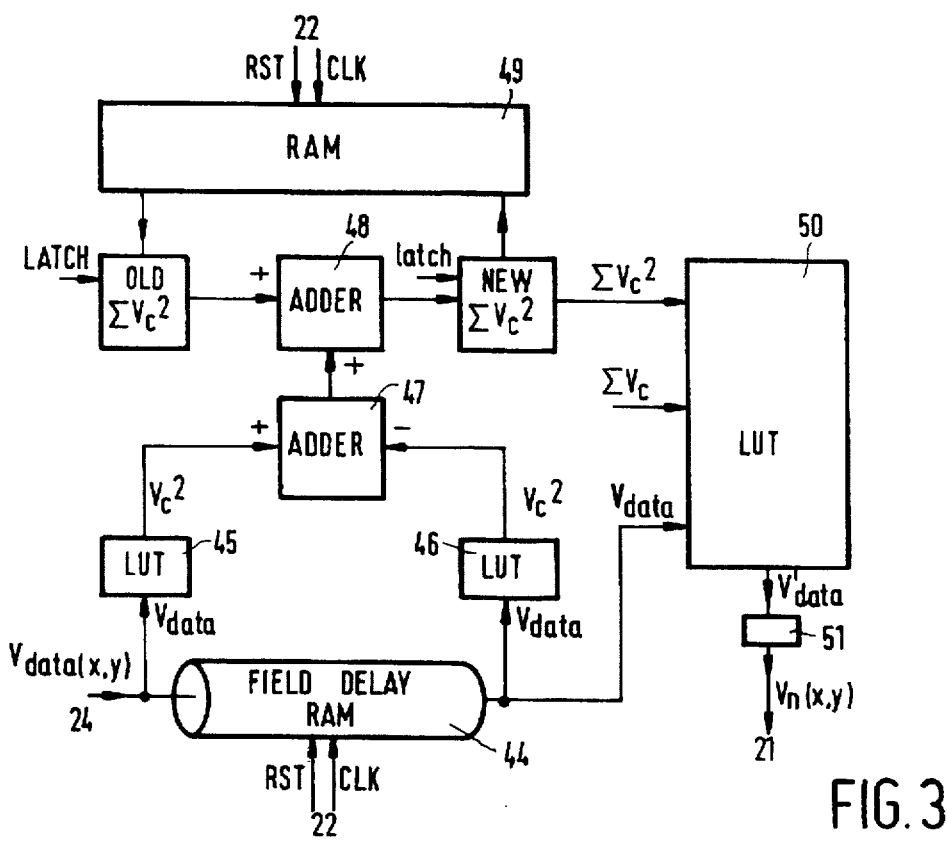
FIG. 3 shows diagrammatically the circuit configuration and operation of part of one embodiment of the drive circuit of the display device of FIG. 1.

Referring to FIG. 3, the field delay (RAM) to which digital representations, V data (x,y), of the analogue video are supplied serially from the processing circuit 24 via an analogue to digital converter (not shown) is designated at 44. The timing of the RAM field delay 44 is controlled by clock and reset signals CLK and RST from the timing and control circuit 22. The signals Vdata are supplied also to a look-up table 45 from which the value Vhd $c^2$ is derived (where Vc is the column voltage), having regard to the voltage transmission characteristics of the display elements. Similarly the signals Vdata outputted from the field store 44 from the preceding field period are supplied to a look-up table 46 from which their $V_c^2$ values are obtained. These values of $V_c^2$ from look-up tables 45 and 46 are fed to an adder 47 whose output ($V_c^2$ the new field minus $V_c^2$ from the old field) is supplied to a further adder 48 where it is added to the previous summation ($\Sigma V_c^2$) stored in a line buffer (RAM) 49, controlled by clock and reset signals CLK and RST from the circuit 22, to derive a new summation ($\Sigma V_c^2$). This is then supplied as a first input to a correction look-up table 50 and written back to the line buffer RAM 49. A similar system, but with different look-up tables 45 and 46, is used to derive the summation of $V_c(\Sigma V_c)$ which is supplied as a second input to the look-up table 50. A third input of the circuit 50 is supplied with picture element data values, Vdata, outputted from the field delay 44. Adjusted picture element Vdata signals, duly corrected in accordance with equations 1.2 (or 1.3) and 2.1, obtained from the look-up table 50 are then fed in serial form to the column driver circuit 21 via a digital to analogue converter, giving the adjusted data voltage signals Vn (x,y) where they are then sampled to provide serial to parallel conversion and supplied to the appropriate column conductors to drive the picture elements. Instead of deriving $\Sigma Vc$ and $\Sigma Vc^2$ separately and supplying these values independently to the LUT50, it may be possible to derive an approximation for $\Sigma Vc^2$ from $\Sigma Vc$. However, while such a technique could allow a reduction in the necessary circuit componentry the data signal compensation achieved will inevitably be less accurate. The embodiment described above with reference to FIG. 3 is able to provide very effective compensation for most usual kinds of display pictures but for its implementation it requires a field store in order that the compensation is calculated from the actual data signals for display elements, as determined by the input video signal, for the next field. In another embodiment, an alternative approach is used which is capable of providing adequate compensation without the need for a field store in situations where it is expected that the display produced will entail to a large extent stationary pictures or pictures comprising stationary parts for periods of time. Whilst for this alternative approach compensation is obtained only so far as stationary parts of the displayed images are concerned, it offers the advantage that a field store is not required so that comparatively simple, and consequently less expensive, circuitry can be used. The vertical crosstalk compensation algorithm, which effectively is embodied in the LUT 50, uses the equation 1.2 to derive the display element voltage after the effect of column coupling. In the previous embodiment, the derivation of the display element voltage according to this formula was simplified, for implementation purposes, by the use of running sums for every column, by means of line buffers/stores, i.e. store 49 in FIG. 3. The field store 44 is needed because the summations, and therefore the compensation to be applied, depend on the next actual n−1 column data signal voltages. The principles of the compensation algorithm (equation 1.2) in this alternative embodiment remain the same but the manner in which the column sums are calculated differ. Such calculations are based on the assumption that, because a static image is being displayed, the column voltage one field period later will simply be the negative (in the case of field inversion operation) of the current column voltage. Therefore, running column voltage sums: (corresponding to sums $\Sigma Vc$ and $\Sigma Vc^2$ with reference to FIG. 3) can be maintained by using the current column voltage value to predict the future column voltage value (after one field). In the previous embodiment, therefore, an input data signal is adjusted according to a compensation value that is derived from data signals intended for other picture elements connected to the same column conductor over the subsequent field period which intended data signals are the actual data signals determined by an input video signal and it is this need to know the actual data signals according to the applied video signal for the forthcoming field period which necessitates a field store. In this alternative embodiment, on the other hand, the compensation value used for adjusting a data signal is similarly derived from the values of data signals intended for other picture elements connected to the same column conductor over the subsequent field period, but the intended data signals are postulated rather than actual and assumed to be merely the inverse of the corresponding picture element data signals in the current field.

The operation of the data signal adjustment circuit to this end requires a pair of sums for each summation $\Sigma Vc$ and $\Sigma Vc^2$ to be maintained for each picture element column. These sums can be held in a linestore, each location in which contains the sums for a particular column.

Figure 4:
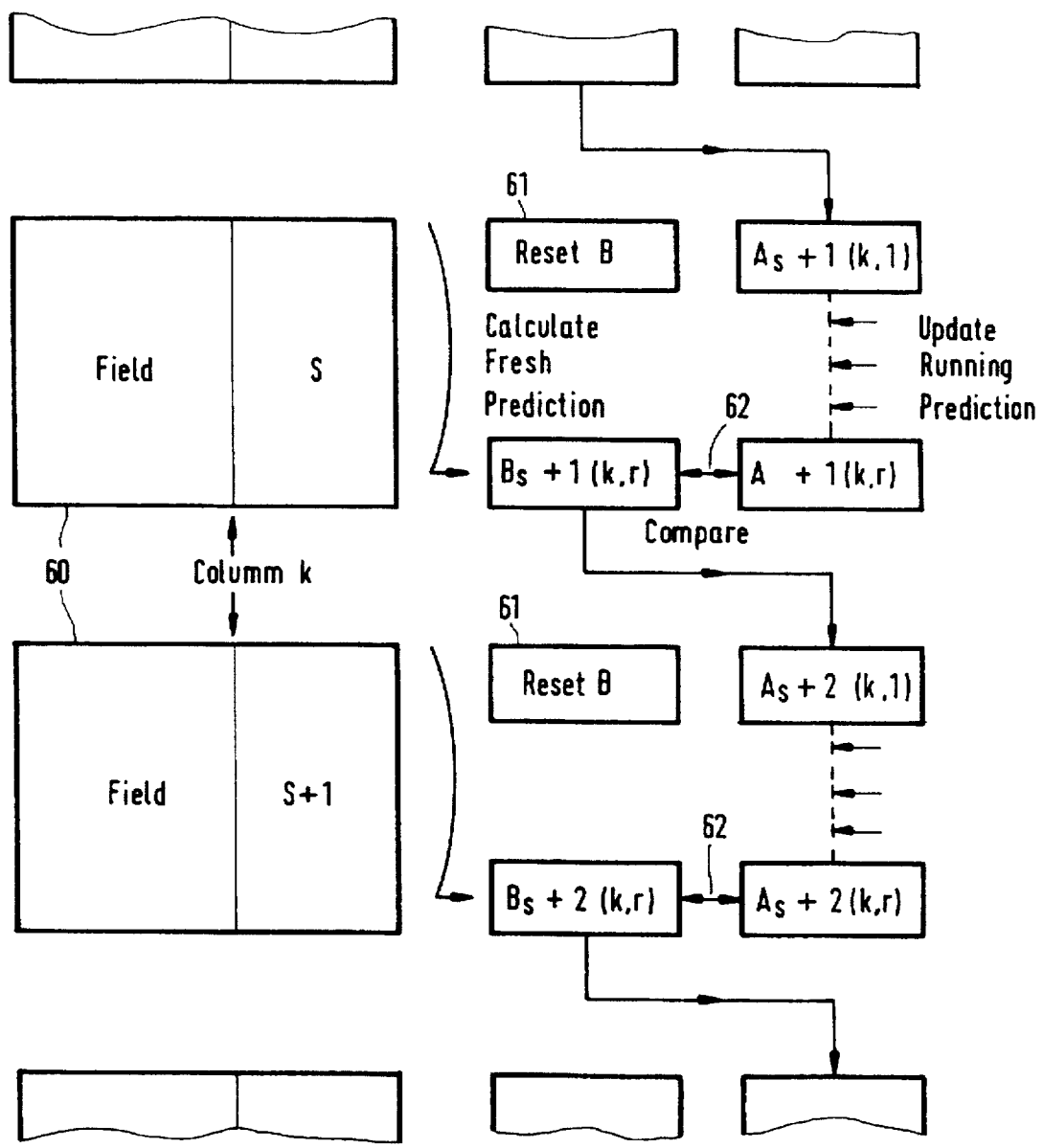
FIG. 4 illustrates diagrammatically the operation of part of a second embodiment of the drive circuit of the display device.

The operation of the data signal adjustment circuit is illustrated diagrammatically in FIG. 4 in the form of a kind of flowchart. Referring to FIG. 4, the operation as depicted covers two consecutive fields, field s and field s+1, and concerns only one column, column k, of the display panel is shown but the operation in so far as the generation of corrected signals for all other columns is concerned will be identical.

In FIG. 4, the letter A represents a sum ΣVc referred to previously and is a running prediction, (stored in a linestore) of the column sum for column k, (as indicated by the line in the boxes 60 representing the display array) over the next field period, so that As+1 (k,1) and As+1 (k,n) denote the column sums for field s+1 for the picture element at column k, row 1 and row n respectively. The letter B signifies a fresh prediction of the value of the column sum, stored in the linestore, for column k at the end of the next field period. Thus, sum B is equivalent to ΣVc but worked out from zero over each field and to this end sum B is reset to zero at the beginning of each field, as indicated at 61 in FIG. 4. Sum B is compared with Sum A and used to correct Sum A if they differ once every field period, as indicated at 62.

The procedure for calculating each sum is as follows.

Firstly, with regard to calculating Sum A, then Sum $A_{p+1}(k,i)$ is a running prediction of the column sum for column k over the next field period from row i+1 in field s to row i−1 in field s+1. The sum is updated each time the data signal for a picture element in column k is received. The update is based on the assumption that $V_{c(k,i)}$ in the current field will be equal to $-V_c(k,i)$ in the next field. Therefore:

$$A_{s+1(k,i)} = A_{s+1(k,i-1)} - 2V_{c(k,i)} \qquad (4.1)$$

With regard to calculating sum B, then Sum $B_{s+1}(k,n)$ is a fresh prediction of what the column sum for column k will be at the end of field s+1. Sum B is set to zero at the start of field s. The predicted sum is then calculated during field s using the assumption that the $V_{c(k,i)}$ in field s will be equal to $-V_{c(k,i)}$ in the field p+1. Therefore, by the end of field p, sum B is given by:

$$B_{s+1(k,n)} = \sum_{i=2}^{i=n} V_{c(s+1)(k,i)} = -\sum_{i=2}^{i=n} V_{c(s)(k,i)} \qquad (4.2)$$

At the end of each field sum B is used to correct Sum A. If the picture is static then the two sums will be equal. However, if the picture has changed Sum A will be incorrect and will not be equal to Sum B.

Sum A can be substituted into equation 1.2 and used in the LUT 50 in order to calculate the vertical crosstalk correction for picture element (k,i). This formula used in the compensation algorithm involves a squared sum as well. This squared sum, $\Sigma Vc^2$, is derived in a similar way.

This technique produces the same results on static images as the technique of the previous embodiment which uses the field store. This time, because the information does not change from field to field, the field store is not necessary. However, if a moving picture is displayed, the column voltage predictions, the running sums, and hence the crosstalk corrections will become incorrect. Sudden changes between two images will imply that the corrections on 2 fields would be wrong but it is highly unlikely that this will be noticeable. The wrong correction will only be present for two field periods, (about 33 ms for a 60 Hz display).

Complications arise when continuous motion is portrayed which implies continuous changes. Under these circumstances the "wrong" correction may become visible in the displayed image since it would be continuously present. To avoid this possibility the correction for a particular column can be turned off depending on the values of sums A and B at the end of each field period. The columns which have not changed significantly can have the correction applied to them during the next field while the ones which have changed significantly can be excluded from the correction. Therefore, in order for compensation to be applied to the picture elements in column k during field s+1 the following condition is applied:

$$|A_{s+1(k,n)} - B_{s+1(k,n)}| \leq d \qquad (4.3)$$

This condition is determined at the "compare" stage in FIG. 4. The value of d can vary from 0 (most sensitive) to the theoretical maximum (effectively disabled). A correction on/off bit for each column must be stored for the duration of the field period. This can be held in the linestore, along with the sums of each column.

Figure 5:
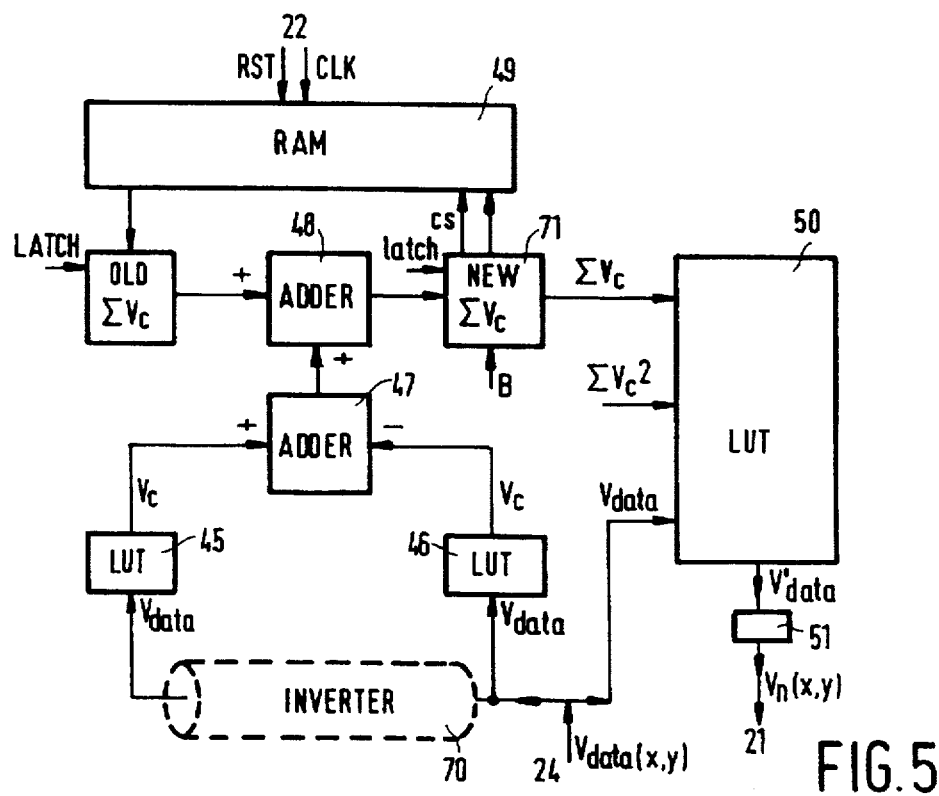
FIG. 5 shows diagrammatically the circuit configuration of a part of the second embodiment of the drive circuit for comparison with that of FIG. 3.

FIG. 5 schematically illustrates for the purposes of comparison with that of FIG. 3 an example form of circuit implementation for the compensation unit 40 in this embodiment. This example shows how ΣVc, i.e. sum A, is generated for supply to the LUT 50. From this Figure, it can be seen that a main difference is that rather than having a field store in the form of a field delay RAM, 44 in FIG. 3, the circuit in this embodiment has, in effect, a negative field delay in the form of an inverter 70 to which digital representations, V data (x,y), of the analogue video are supplied, and also to the LUT 50, and from which the 'future' data, that is the predicted data for the subsequent field and comprising inversions of the present data are supplied to the LUT 45. The new ΣVc, i.e. A, is corrected, at 71, once every field period by the sum B. This correction involves the comparison stage, as described with reference to FIG. 4, and formula 4.3 in which the value d is determined and as a result of which an 'on' or 'off' correction control signal (bit) cs, depending on the value of d, is supplied to the linestore RAM 49 to indicate whether or not corrected data signals are to be used, for the particular column concerned, in the next field period.

Figure 6:
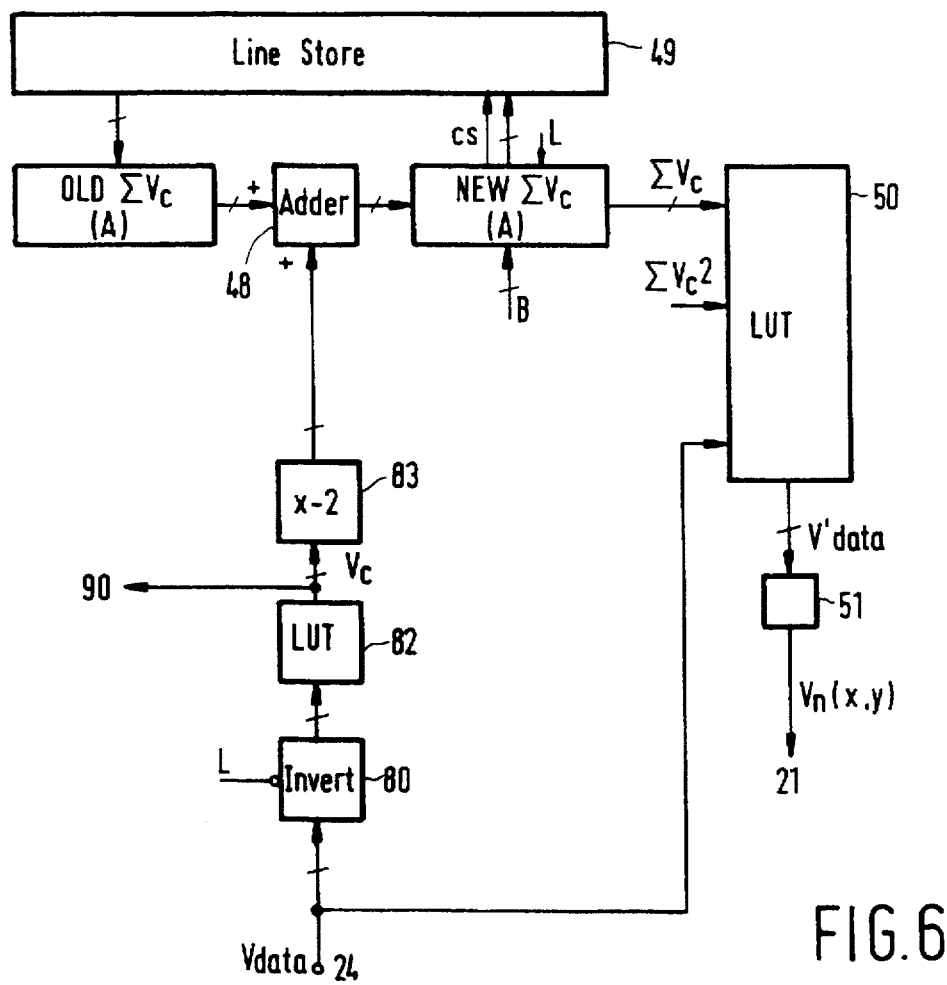
FIGS. 6 and 7 illustrate schematically a practical circuit implementation and operation of the second embodiment of the drive circuit.
Figure 7:
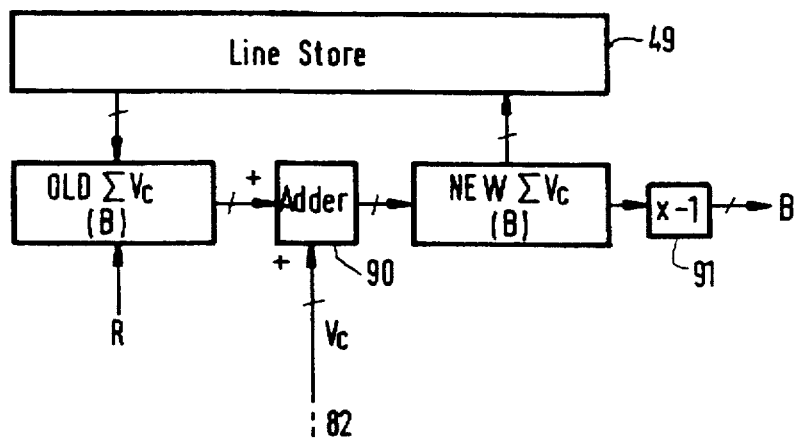

The form of circuit implementation in FIG. 5 is intended for simple comparison purposes. A practical implementation of the circuit is shown in FIGS. 6 and 7, with FIG. 6 illustrating how the sum A would be generated and used to provide corrected data signals in practice. With regard to FIG. 6, video data, V data, from the processing circuit 24 and fed to an input is supplied both to the LUT 50 and an inverter 80 whose operation is controlled by an input signal L according to whether the line concerned is a positive or negative line. The output from the inverter 80 is fed to a look-up table 82, corresponding to the LUT 45 in FIG. 3, from which the values Vc are derived. The values of Vc are then supplied to a times minus two multiplier 83 to give the value of −2 Vc which is then used in the adder 48, together with the old Sum A obtained from the linestore 49, (having regard to the requirement of equation 4.1), to provide a new ΣVc (Sum A).

Referring to FIG. 7, the predicted Sum B, used to correct sum A at the end of each field period is calculated by taking the values of Vc from the output of LUT 82 and applying them to an adder 90 to which the old ΣVc, (B), from row zero to the row concerned, obtained from the linestore 49 is also supplied to provide a new ΣVc which is then written into the linestore 49 and also fed at the end of each field period to a two's complement inverter 91 which inverts all the bits of the sum and adds one to the result and whose output values, Sum B, are then used as a fresh prediction to correct the running sum A at the end of each field. The old ΣVc values applied to the adder 90 are reset to zero at the start of each field, as signified in FIG. 7 by the reset signal R.

The sum $\Sigma Vc^2$ also input to the LUT 50 is generated using a similar circuit except that values of $Vc^2$ rather than Vc are given by an LUT equivalent to LUT 82. As mentioned previously in relation to the FIG. 3 embodiment, it might be possible instead to derive an approximation for $\Sigma Vc^2$ from $\Sigma Vc$. This would lead to a reduction in the amount of circuitry needed but less accurate compensation should be expected.

In the above-described embodiments, the adjustment effected for each picture element is based on the data signal levels for all other picture elements in the same column. The nature of the circuits 40 in both embodiments and their manner of operation makes this reasonably straightforward to achieve. However, using for example alternative kinds of adjustment circuits, it is possible that the adjustment of the data signal voltage for a picture element may be accomplished using less than all the data signals which are intended to be applied to the same column conductor in the period following addressing the picture element and its next addressing. Using the data signals for a proportion of the other picture elements would provide less reduction in cross-talk but nevertheless could give results which are acceptable and adequate in certain situations.

From reading the present disclosure, other modifications will be apparent to persons skilled in the art. Such modifications may involve other features which already known in the field of liquid crystal display devices and which may be used instead of or in addition to features already described herein.

What is claimed:

1. An active matrix display device having a display panel comprising an array of picture elements each comprising a liquid crystal display element and a switching device connected to the display element, and sets of row and column address conductors connected to the picture elements, the active matrix display device comprising a drive circuit for applying data signals to the column address conductors and for repetitively scanning the row address conductors to select each row of picture elements in sequence to drive the display elements of a selected row in accordance with the data signals applied to the associated column address conductors, the drive circuit including a data signal adjustment circuit for compensating for the effects of vertical cross-talk in the display panel due to capacitive coupling between each display element and the column address conductor associated with said each display element, said data signal adjustment circuit having an input to which input data signals are applied, said data signal adjustment circuit adjusting the input data signal for any particular picture element by adding an individually determined cross-talk compensation value to the input data signal for said any particular picture element, the individually determined cross-talk compensation value being derived from values of the input data signals for at least some of the other picture elements connected to the same column address conductor as said any particular picture element and addressed after said any particular picture element is addressed within a present frame or before said any particular picture element is addressed in a next frame, and the data signal adjustment circuit having an output from which the adjusted data signals are supplied to the column address conductors for driving the picture elements.

2. The active matrix display device of claim 1, wherein the data signal adjustment circuit derives the individually determined cross-talk compensation value for the input data signal of said any particular picture element from the input data signals for substantially all the other picture elements connected to the same column address conductor as said any particular picture element.

3. the active matrix display device of claim 1, wherein the data signal adjustment circuit includes a store in which signals are held for at least one whole field and from which unadjusted data signals are read out and adjusted by data signal adjustment circuit in accordance with a cross-talk compensation value determined from the unadjusted input data signals held in the store.

4. The active matrix display device of claim 1, wherein the data signal adjustment circuit adjusts an input data signal in accordance with a cross-talk compensation value which is derived from the values of data signals input during an immediately preceding field period.

5. An active matrix display device having a display panel comprising an array of picture elements each comprising a liquid crystal display element and a switching device connected to the display element, and sets of row and column address conductors connected to the picture elements, the active matrix display device comprising a drive circuit for applying data signals to the column address conductors and for repetitively scanning the row address conductors to select each row of picture elements in sequence to drive the display elements of a selected row in accordance with the data signals applied to the associated column address conductors, the drive circuit including a data signal adjustment circuit for compensating for the effects of vertical cross-talk in the display panel due to capacitive coupling between each display element and the column address conductor associated with said each display element, said data signal adjustment circuit having an input to which input data signals are applied, said data signal adjustment circuit adjusting the input data signal for any particular picture element by adding an individually determined cross-talk compensation value to the input data signal for said any particular picture element, the individually determined cross-talk compensation value being derived from values of the input data signals for at least some of the other picture elements connected to the same column address conductor as said any particular picture element and addressed after said any particular element is addressed within a present frame of before said any particular picture element is addressed in a next frame, and the data signal adjustment circuit determining the individually determined compensation value for the input data signal for said any particular picture element by combining the values of said input data signals for at least some of the other picture elements connected to the same column address conductor, each of said values being multiplied by a capacitive coupling factor for said any particular picture element, the capacitive coupling factor for said any particular picture element having a value dependent at least on the capacitance of the switching device connected to said any particular picture element, the data signal adjustment circuit having an output from which the adjusted data signals are supplied to the column address conductors for driving the picture elements.

6. The active matrix display device of claim 5, wherein the data signal adjustment circuit derives the individually determined cross-talk compensation value for the input data signal of said any particular picture element from the input data signals for substantially all the other picture elements connected to the same column address conductor as said any particular picture element.

7. The active matrix display device of claim 6, wherein the data signal adjustment circuit includes a store in which input data signals are held for at least one whole field and from which unadjusted data signals are read out and adjusted by the data signal adjustment circuit in accordance with a cross-talk compensation value determined from the unadjusted input data signals held in the store.

8. The active matrix display device of claim 6, wherein the data signal adjustment circuit adjusts an input data signal in accordance with a cross-talk compensation value which is derived from the values of data signals input during an immediately preceding field period.

9. The active matrix display device of claim 8 wherein the data signal adjustment circuit is arranged to disable the adjustment of input data signals for a column in the event that values of the input data signals for the column change by more than a predetermined amount in consecutive field periods so that the input data signals for the column are supplied to the picture elements of that column without adjustment.

10. The active matrix display device of claim 5, wherein the data signal adjustment circuit includes a store in which input data signals are held for at least one whole field and from which unadjusted data signals are read out and adjusted by the data signal adjustment circuit in accordance with a cross-talk compensation value determined from the unadjusted input data signals held in the store.

11. The active matrix display device of claim 5, wherein the data signal adjustment circuit adjusts an input data signal in accordance with a cross-talk compensation value which is derived from the values of data signals input during an immediately preceding field period.

12. An active matrix display device having a display panel comprising an array of picture elements each comprising a liquid crystal display element and a switching device connected to the display element, and sets of row and column address conductors connected to the picture elements, the active matrix display device comprising a drive circuit for applying data signals to the column address conductors and for repetitively scanning the row address conductors to select each row of picture elements in sequence to drive the display elements of a selected row in accordance with the data signals applied to the associated column address conductors, the drive circuit including a data signal adjustment circuit for compensating for the effects of vertical cross-talk in the display panel due to capacitive coupling between each display element and the column address conductor associated with said each display element, said data signal adjustment circuit having an input to which input data signals are applied, said data signal adjustment circuit adjusting the input data signal for any particular picture element by adding an individually determined cross-talk compensation value to the input data signal for said any particular picture element, the individually determined cross-talk compensation value being derived from values of the input data signals for at least some of the other picture elements connected to the same column address conductor as said any particular picture element and addressed after said any particular picture element is addressed within a present frame or before said any particular picture element is addressed in a next frame, and the data signal adjustment circuit having an output from which the adjusted data signals are supplied to the column address conductors for driving the picture elements, wherein the data signal adjustment circuit adjusts the input data signal for a picture element in a given column substantially according to the formula:

$Vn = Vc - Vp$ where Vc and Vn are respectively the input data signal and the adjusted data signal and in which $\Delta Vp$ is given by:

$$\Delta Vp = \frac{1}{\sqrt{n-1}} \sqrt{\sum_{i=2}^{i=n}(V_p + cV_c(i))^2} - V_p$$

where n is the number of rows of picture elements, $V_c(i)$ are the intended individual data signal voltages for the other picture elements connected to the same column address conductor, Vp is the intended display element voltage, and c is a capacitive coupling factor determined by stray capacitance in a picture element.

13. The active matrix display device of claim 12, wherein the data signals are provided as a video signal in which successive fields are separated by a field blanking interval, and the data signal adjustment circuit is operable to provide cross-talk compensation values which are derived in accordance with the data signals for all the picture elements associated with the same column conductor and also a field blanking level of the video signal.

14. A method of driving an active matrix display device having a row and column array of picture elements which each comprise a liquid crystal display element connected to a switching device and which are connected to sets of row and column address conductors, comprising the steps of (a) applying selection signals to the row address conductors to select each row of picture elements in turn, (b) applying data signals which are input to the display device to the column address conductors whereby the display elements of a selected row of picture elements are driven according to the data signals on their associated column address conductors, (c) driving the rows of picture elements repetitively in successive field periods, (d) adjusting, before being applied to a column address conductor, an input data signal for a picture element associated with a column address conductor to compensate for the effects of vertical cross-talk in the display panel due to capacitive coupling between the display elements and associated column address conductors according to a cross-talk compensation value determined by the values of input data signals for at least some of the other picture elements associated with that column address conductor in a period until the picture element is next addressed.

15. The method of claim 14, further comprising the step of holding each input data signal in a store for a field period and then adjusting said signal according to a crosstalk compensation value derived from the values of the input data signals for the other picture elements in the same column which are loaded into the store during that field period.

16. The method of claim 14, further comprising adjusting an input data signal according to a cross-talk compensation value that is derived from the values of data signals for picture elements in the same column input during an immediately preceding field period.

* * * * *